US009566860B2

(12) United States Patent
Holzwarth et al.

(10) Patent No.: US 9,566,860 B2
(45) Date of Patent: Feb. 14, 2017

(54) TANK VENTING FILTER

(71) Applicant: MANN+HUMMEL GMBH, Ludwigsburg (DE)

(72) Inventors: Marcel Holzwarth, Ludwigsburg (DE); Michael Heim, Korntal-Muenchingen (DE); Adriano Horiye, Stuttgart (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 81 days.

(21) Appl. No.: 14/540,875

(22) Filed: Nov. 13, 2014

(65) Prior Publication Data
US 2015/0135666 A1    May 21, 2015

(30) Foreign Application Priority Data

Nov. 18, 2013 (DE) ........................ 10 2013 019 181

(51) Int. Cl.
| B60K 15/035 | (2006.01) |
| B01D 46/24 | (2006.01) |
| B01D 46/00 | (2006.01) |
| B60K 15/03 | (2006.01) |

(52) U.S. Cl.
CPC ......... B60K 15/035 (2013.01); B01D 46/0043 (2013.01); B01D 46/2403 (2013.01); *B01D 2279/35* (2013.01); *B60K 2015/03236* (2013.01)

(58) Field of Classification Search
CPC .............. B01D 53/0415; B01D 2253/102; B01D 2253/25; B01D 2257/2045; B01D 2257/2064; B01D 2257/40; B01D 2257/708; B01D 2257/304; B01D 2259/4525; B01D 2259/4575; B60R 16/0239; F21S 48/335

USPC ........... 55/310, 385.4, 462, DIG. 19; 95/90; 96/131, 153; 137/589, 899; 280/838
See application file for complete search history.

(56) References Cited

U.S. PATENT DOCUMENTS

| 3,546,853 A | 12/1970 | Claar |
| 6,015,444 A * | 1/2000 | Craft ................. F16H 57/027 220/371 |
| 6,395,068 B1 * | 5/2002 | Rooney ............. B01D 53/0415 137/589 |
| 7,517,392 B2 * | 4/2009 | Neff ........................ F16K 17/19 137/176 |

(Continued)

FOREIGN PATENT DOCUMENTS

| DE | 602004005222 T2 | 11/2007 |
| GB | 773490 A | 4/1957 |
| GB | 1492709 A | 11/1977 |

*Primary Examiner* — Jacob T Minskey
*Assistant Examiner* — Minh-Chau Pham
(74) *Attorney, Agent, or Firm* — James Hasselbeck

(57) ABSTRACT

A tank venting filter is provided with a housing extending in a direction of a longitudinal filter axis and provided with a bottom side and a topside opposite the bottom side. A filter element is arranged in the housing. The housing has an air inlet at the bottom side and an air outlet at the topside. The air inlet is provided in the housing transverse to the longitudinal filter axis. The housing has a housing bottom at the bottom side, wherein the housing bottom closes off a filter interior of the housing in a downward direction and is positioned at a spacing from the filter element. The housing bottom has an inner side facing the filter interior. The inner side ends in the air inlet and is positioned at least sectionwise at an obtuse angle relative to the longitudinal filter axis.

19 Claims, 2 Drawing Sheets

(56) References Cited

U.S. PATENT DOCUMENTS

| | | | |
|---|---|---|---|
| 7,678,169 B1* | 3/2010 | Gwin | B01D 45/06 |
| | | | 123/41.86 |
| 8,246,726 B2* | 8/2012 | Yano | B60R 16/0239 |
| | | | 123/41.86 |
| 8,277,295 B2* | 10/2012 | Yano | H05K 5/068 |
| | | | 361/694 |
| 8,852,324 B2* | 10/2014 | Bauer | H01M 2/1241 |
| | | | 29/446 |
| 2003/0150197 A1* | 8/2003 | Traut | E03F 5/08 |
| | | | 55/385.4 |
| 2006/0081634 A1 | 4/2006 | Messinger | |
| 2007/0101864 A1* | 5/2007 | Nakanoya | F17C 13/04 |
| | | | 96/108 |
| 2009/0084078 A1* | 4/2009 | Furuyama | F21S 48/335 |
| | | | 55/385.4 |

* cited by examiner

TANK VENTING FILTER

BACKGROUND OF THE INVENTION

The invention concerns a tank venting filter comprising a housing that is extending in the direction of its longitudinal filter axis and comprising a filter element arranged in the housing.

When from a tank, for example, a fuel tank or urea tank of a motor vehicle, a liquid is removed, the tank must be vented in order to avoid underpressure within the tank. The tank venting device enables sucking in ambient air into the tank upon removal of the liquid. When sucking in the ambient air, foreign matter, in particular dust, dirt or water, may however pass into the tank. Primarily when driving in rain, high water introduction may occur. In order for the foreign matter not to reach the tank, the tank venting device has in general a tank venting filter. Such a tank venting filter is the subject matter of the present invention.

U.S. Pat. No. 3,546,853 A discloses a filter extending in longitudinal direction which has intake openings at its bottom side. A filter element introduced into the filter is substantially cylindrical. Inflow of the medium to be filtered occurs against the outer cylindrical wall surface of the filter element.

GB 773 490 A discloses an intake device for a liquid. Upon sucking in the liquid, air is sucked in at the top side of the intake device. In the intake device, a filter element for filtering the liquid is provided.

Finally, US 2006/0081634 A1 discloses a filter for a tank venting device. The filter has air inlets at the top side. The connecting socket to the tank is embodied at the bottom side of the filter.

The filters known from the prior art have the disadvantage that the filter elements in the filter clog relatively quickly with dust, dirt, or water.

It is the object of the present invention to provide a constructively simple tank venting filter whose filter element will clog significantly more slowly with dust, dirt or water.

SUMMARY OF THE INVENTION

This object is solved according to the invention with a tank venting filter comprising a housing extending in the direction of its longitudinal filter axis and comprising a filter element arranged in the housing, wherein the housing comprises an air inlet in the area of its bottom side and an air outlet in the area of its topside positioned opposite the bottom side, wherein the air inlet is embodied in the housing transverse to the longitudinal filter axis and the housing in the area of the air inlet comprises a housing bottom that closes off a filter interior in downward direction, wherein the inner side of the housing bottom ends in the air inlet and at least sectionwise is positioned at an obtuse angle w relative to the longitudinal filter axis, and wherein the housing bottom is positioned at a spacing A from the filter element. The dependent claims provide expedient further embodiments.

The tank venting filter according to the invention is an air filter. However, a configuration of the tank venting filter as a filter for filtration of other media, for example, for filtration of gas mixtures other than air or for filtration of gases or also for filtration of liquids, in particular for filtration of fuel or oil, is also conceivable.

The tank venting filter comprises a housing, extending in the longitudinal direction, in which a filter element is arranged. The housing of the tank venting filter comprises an air inlet in the area of its bottom side and an air outlet in the area of its topside that is opposite the bottom side. The air inlet is configured in the housing transversely to the longitudinal filter axis. In other words, the plane vector of the opening plane of the air inlet is extending transverse to the longitudinal filter axis. In other words, the air inlet is embodied in at least one sidewall of the housing, wherein the sidewall is substantially parallel to the longitudinal filter axis.

In the area of the air inlet, the housing has a housing bottom that closes off a filter interior in downward direction wherein the inner side of the housing bottom ends in the air inlet and at least sectionwise is positioned at an obtuse angle w relative to the longitudinal filter axis. An obtuse angle w is to be understood as an angle w>90° and <180°. The housing bottom is spaced at a distance A from the filter element. A filter interior is to be understood as a hollow space between the housing bottom and the filter element, wherein the hollow space is delimited laterally by the sidewall of the housing or the sidewalls of the housing.

The air flow that is sucked in through the air inlet flows against the inner side of the housing bottom and is thereby deflected in the direction of the longitudinal filter axis toward the filter element. Since the filter element is arranged at a spacing A relative to the housing bottom, the sucked-in air must rise across the distance A toward the filter element. As the sucked-in air rises, sedimentation of dust, dirt, and water occurs. In other words, dust, dirt, and water are deposited on the housing bottom by the effect of gravity. Rising of the air is realized in the filter interior that is therefore acting as a separation chamber.

Since the inner side of the housing bottom ends in the air inlet, the deposits of dust, dirt, and water can escape from the tank venting filter. For example, the deposits may be transported out of the tank venting filter by vibrations of a motor vehicle that comprises the tank venting filter according to the invention.

The housing is preferably configured to be rotation-symmetrical relative to the longitudinal filter axis. Particularly preferred, the entire tank venting filter is rotation-symmetrical relative to the longitudinal filter axis. In this way, the housing or the tank venting filter can be embodied constructively in a particularly simply and therefore inexpensively way.

In case of a housing that is rotation-symmetrical relative to the longitudinal filter axis, the housing can have a single sidewall. Alternatively, a housing that is polygonal in cross-section may have several sidewalls. The sidewall or the sidewalls extend substantially parallel to the longitudinal filter axis.

The air inlet may have several circumferentially positioned inflow openings. The inflow openings are preferably separated only by narrow webs. The total width of all webs in the circumferential direction can be less than 50% of the total width of all inflow openings in the circumferential direction. Preferably, the total width of all webs in the circumferential direction is less than 40%, particularly preferred less than 30%, of the total width of all inflow openings in the circumferential direction. As a result of the narrow webs, wide inflow openings are produced. Due to the wide inflow openings, a low inflow rate of the air into the air inlet can be achieved. Due to the low inflow rate, a long residence time of the air upstream of the filter element can be achieved. The quantity of the dust, dirt, and water which is sucked in with the air and sedimented in the interior can therefore be increased.

The air outlet is preferably embodied centrally on the topside of the filter. In this way, the tank venting filter can be used as an inline filter in a simple way.

The angle w can be 95° to 160°, in particular 100° to 150°, preferably 105° to 140°, particularly preferred 110° to 130° especially preferred 115° to 120°.

The inner side of the housing bottom is preferably conically shaped with a tip pointing toward the filter element. In this context, the housing bottom has preferably as a whole the shape of a conical Asian hat. In other words, the housing bottom preferably has the shape of a conical umbrella. The housing bottom is preferably connected by webs with the other housing sections wherein between the webs inflow openings are formed that form the air inlet of the filter. Due to the conical configuration of the housing bottom, the air flow can enter at several sides transversely to the longitudinal filter axis through the air inlet into the filter interior and can be deflected along the longitudinal filter axis in the direction of the filter element. Turbulences of the air flow can be avoided. The foreign matter of the air flow can thereby fall downwardly without being swirled up. Accordingly, the sedimentation rate of the foreign matter is increased.

The spacing A is preferably greater than 60%, in particular greater than 70%, particularly preferred greater than 80%, of the maximum width B of the filter interior measured perpendicular to the longitudinal axis. Accordingly, the air flow must rise a long distance within the filter interior. During this rising time, a larger quantity of foreign matter can sediment within the filter interior. In case of a housing which is of rotational symmetry relative to the longitudinal filter axis, the maximum width measured perpendicular to the longitudinal axis corresponds to the diameter of the filter interior.

The filter interior can be embodied in the direction of the longitudinal filter axis with a conical shape, with the inner diameter decreasing toward the housing bottom, or a cylindrical shape. The filter interior is therefore of rotational symmetry relative to the longitudinal filter axis. Particularly preferred, the filter interior is conically shaped so that the cross-sectional surface area of the filter interior increases from the housing bottom toward the filter element. Accordingly, the air flow in the direction of the longitudinal filter axis is slowed toward the filter element. The time that is required by the air flow in order to rise to the filter element is prolonged. The sedimentation can thus be more effectively realized.

Sedimentation in the filter interior can be realized particularly free of turbulences and in a controlled fashion when the sidewalls of the housing between the lowermost area of the filter element, projected perpendicularly to the longitudinal filter axis onto the sidewalls, and the uppermost area of the housing bottom, projected perpendicularly to the longitudinal filter axis onto the sidewalls, are of a closed configuration. In other words, the sidewalls are embodied without openings, i.e., thus have no passage cutouts from the uppermost area of the housing bottom to the lowermost area of the filter element. When the housing in case of a rotation-symmetrical configuration of the housing has only one sidewall, the latter, in analogy to the described embodiment, can preferably be of a closed configuration between the lowermost area of the filter element, projected perpendicularly to the longitudinal filter axis onto the sidewall, and the uppermost area of the housing bottom, projected perpendicularly to the longitudinal filter axis onto the sidewall. In other words, the filter interior is embodied so as to be laterally closed, i.e., closed transverse to the longitudinal filter axis.

Moreover, in the filter interior, an obstacle may be provided in order to achieve a long residence time of the air flow between the housing bottom and the filter element. The obstacle can be, for example, in the form of a baffle plate. Alternatively, the filter interior can be designed to be free of an obstacle.

The housing has preferably a housing bottom part and a housing cover wherein the filter element, in particular at its topside, is fastened between the housing bottom part and the housing cover. Accordingly, an end plate is not needed.

The housing bottom part and the housing cover can be made of plastic material and connected by means of a friction welded seam. The tank venting filter can thus be mounted in a particularly easy way. In this case, the entire tank venting filter can be exchanged as a unit. The welded housing is therefore of a one-part configuration and fused to be materially monolithic. In this way, a particularly seal-tight housing can be provided. Seal tightness tests can thus be dispensed with.

A constructively particularly simple configuration of the filter is characterized in that the filter element is embodied in a cup shape with a sidewall that can be flowed through and a filter element bottom that can be flowed through.

The filter element is preferably embodied monolithically of filter material. Particularly preferred, the filter element is embodied of a flat material. The filter element is preferably embodied such that upon shaping no terminal edges must be glued together.

The sidewall of the filter element can be embodied as a star-shaped folded bellows in order to enlarge the active surface area of the filter element.

The invention concerns moreover a filter element of a filter as described above.

BRIEF DESCRIPTION OF THE DRAWINGS

Further features and advantages of the invention result from the following detailed description of an embodiment of the invention, from the Figures of the drawing showing details important to the invention, as well as from the claims.

The features illustrated in the drawing are illustrated in such a way that the special features according to the invention can be made clearly visible. The various features can be realized each individually or several combined in any combination in variants of the invention.

DESCRIPTION OF PREFERRED EMBODIMENTS

Figure 1:
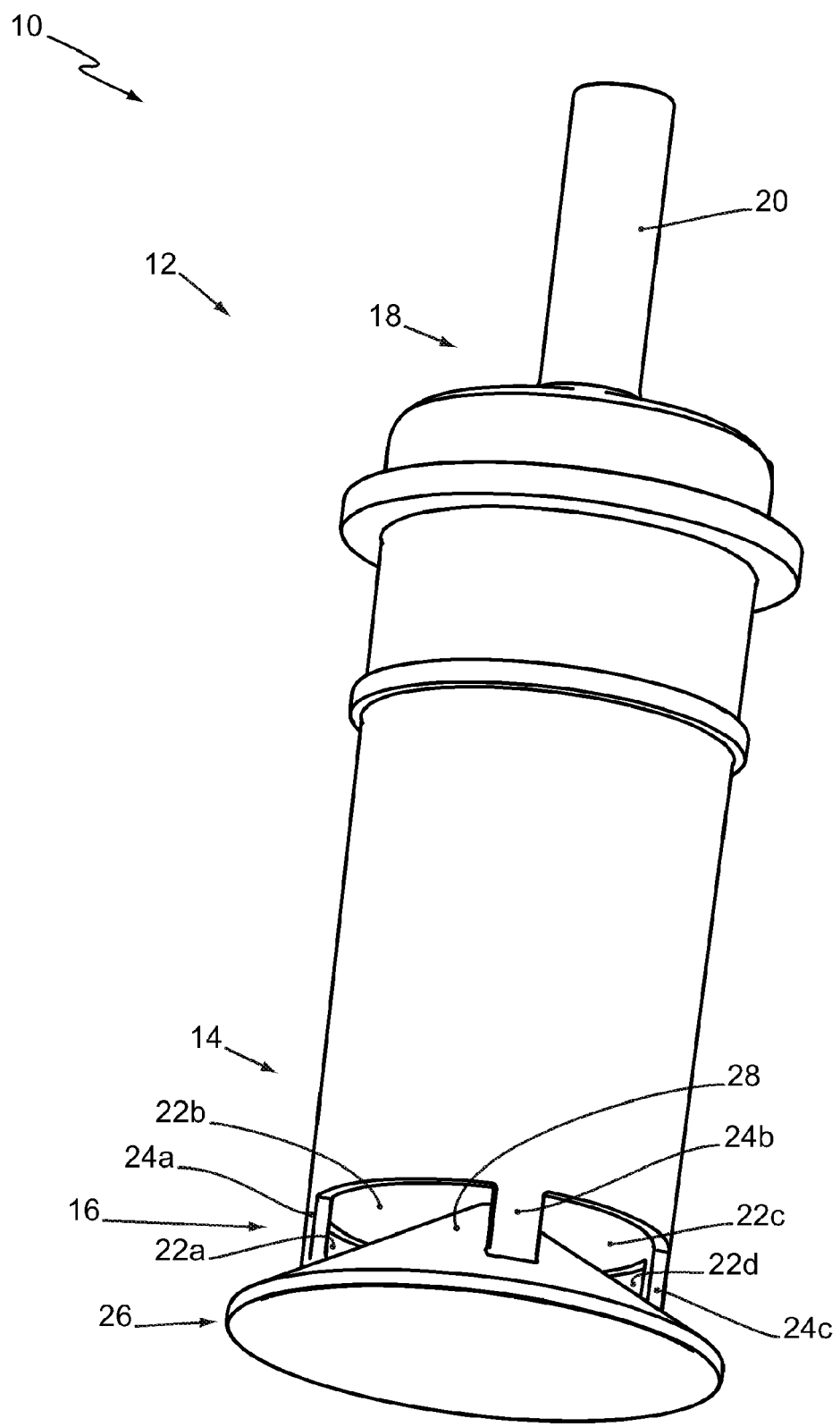
FIG. 1 shows a perspective view of a tank venting filter.

FIG. 1 shows a tank venting filter 10. The tank venting filter 10 serves for venting a tank (not illustrated) of a motor vehicle, for example, an automobile or a truck. When the tank venting filter 10 is provided for use in a truck, it typically has a height, i.e., an extension in longitudinal direction, of 10 cm to 20 cm.

The tank venting filter 10 comprises a housing 12. On the bottom side 14 of the housing 12, the housing 12 has a lateral air inlet 16. At the topside 18 of the housing 12, the housing 12 has an air outlet 20. The air outlet 20 is embodied centrally on the housing 12. The tank venting filter 10 is employed as an inline filter.

The air inlet 16 has four inflow openings 22a-22d. The inflow openings 22a-22d are arranged spaced apart from each other in circumferential direction of the housing. As shown in FIG. 1, the inflow openings 22a-22d are separated from each other by webs 24a-24c. The fourth web between the inflow openings 22a and 22d is embodied mirror-symmetrical to the web 24b, but is not visible in FIG. 1 as a result of the perspective illustration.

The bottom side 14 of the housing 12 comprises a housing bottom 26 by means of which the inflow openings are delimited in downward direction. The housing bottom 26 is connected by the webs 24a-24c as well as the fourth web, not visible in FIG. 1, with the further sections of the housing 12. The inner side 28 of the housing bottom 26 ends in the air inlet 16. More precisely, the inner side 28 of the housing bottom 26 ends in the inflow openings 22a-22d of the air inlet 16.

Figure 2:
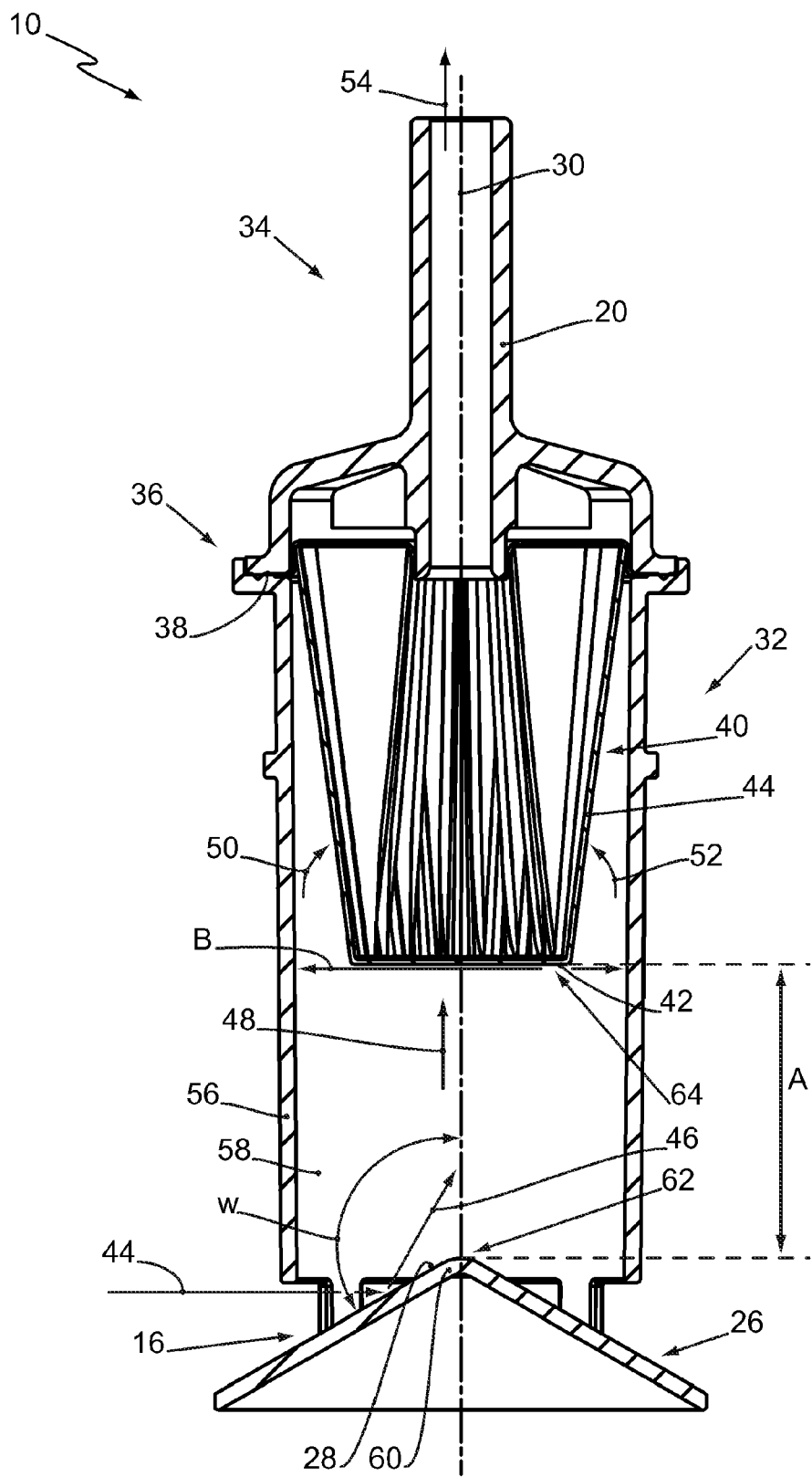
FIG. 2 is a longitudinal section view of the tank venting filter of FIG. 1.

FIG. 2 shows the tank venting filter 10 in a longitudinal section view. FIG. 2 shows also that the tank venting filter 10 is embodied with rotational symmetry relative to the longitudinal filter axis 30.

As shown in FIG. 2, the housing 12 can be of a two-part configuration and may comprise a housing bottom part 32 and a housing cover 34. The housing bottom part 32 and the housing cover 34 are each formed of plastic material and are permanently connected with each other at their interface 36 by a friction welded seam 38.

Between the housing bottom part 32 and the housing cover 34, a filter element 40 is secured by clamping action. In case of a filter element 40 which is embodied of a thermoplastic material, the filter element 40 can also be welded with one or both housing parts of the housing 12. The filter element 40 is substantially of a cup-shaped configuration. A filter element bottom 42 and a sidewall 44 of the filter element are designed to be flowed through. In this context, the sidewall 44 of the filter element 40 is folded to a star-shaped bellows in order to embody the surface area of the filter element 40 as large as possible.

In the following, the path of an air flow through the tank filter 10 will be explained. The air is sucked in at the air inlet 16 in the direction of a first arrow 44 in radial direction relative to the longitudinal filter axis 30 into the housing 12 of the tank venting filter 10. The air inlet 16 is configured in the housing 12 transversely to the filter axis 30. The inner side 28 of the housing bottom 26 is slantedly arranged relative to the longitudinal filter axis and is positioned relative to the longitudinal filter axis 30 at an angle w of approximately 120°. In this way, the air flow is deflected in the direction to the longitudinal filter axis 30 toward the filter element 40. This is indicated in FIG. 2 by a second arrow 46. The air flow passes via the filter element bottom 42 and the sidewall 44 into the filter element 40. This is indicated in FIG. 2 by a third arrow 48, a fourth arrow 50, and a fifth arrow 52. The air flow exits the filter element 40 through the air outlet 20. This is illustrated in FIG. 2 by a sixth arrow 54.

The filter element 40 is arranged at a spacing A above the housing bottom 26. The spacing A defines together with a sidewall 56 of the housing 12 a filter interior 58. The spacing A is greater than 85% of the maximum width B of the filter interior measured perpendicular to the longitudinal axis. As a result of the rotation-symmetrical configuration of the filter interior 58, the width B corresponds to the inner diameter of the filter interior 58. The air flow must rise along the distance A within the filter interior 58. The time required by the air flow to do this is referred to as rising time. During the rising time, foreign matter such as dust, dirt, and/or water contained in the air flow can deposit due to gravity. This process is referred to also as sedimentation. The foreign matter therefore cannot clog the filter element 40. As a result of this, the tank venting filter 10 has a significantly extended service life.

Due to the great spacing A, a long rising time and thus a high sedimentation rate, even of smaller and thus lighter water droplets or particles, is achieved. The rising time is further prolonged in that the air inlet 16 in comparison to the webs 24a-24c (see FIG. 1) has great inflow openings 22a-22d (see FIG. 1). Thus, the air flow therefore enters the housing 12 already at reduced speed in the direction of the first arrow 44 (see FIG. 2).

The inner side 28 of the housing bottom 26 is conical with a tip 16 which is pointing toward the filter element 40. The tip 60 coincides with the longitudinal filter axis 30. In operation of the tank venting filter 10, the air is therefore guided uniformly transverse to the longitudinal filter axis 30 into the air inlet 16 and father in the direction of the filter element 40. Due to this uniform air guiding action, turbulences can be avoided. Accordingly, the sedimentation rate can be further increased. Moreover, due to the slantedly extending, or here conically shaped, inner side 28 of the housing bottom 26, gravity-caused discharge of sedimented particles and deposited precipitation, i.e., water drops, from the tank venting filter is enabled.

The tip 60 constitutes the uppermost area 62 of the housing bottom 26. The filter element bottom 42 constitutes the lowermost area 64 of the filter element 40. The sidewall 56 is of a closed configuration between the uppermost area 62 projected onto the sidewall 56 and the lowermost area 64. In this way, turbulences within the interior 58 can be avoided and, in this way, a high sedimentation rate can be achieved.

The filter interior 58 widens in axial direction from the housing bottom 26 toward the filter element 40. More precisely, the inner side of the sidewall 56 and therefore the interior 58 is conical in the direction of the longitudinal filter axis 30, the inner diameter decreasing toward the housing bottom 28 or increasing toward the filter element 40. The air flow therefore slows on its path from the housing inlet or the housing bottom 28 toward the filter element 40.

In summarizing the above, the invention concerns a tank venting filter 30 with a housing 12, an air inlet 16, an air outlet 20, and a filter element 40 that is arranged therebetween and can be flowed through. Between air inlet 16 and filter element 40, a filter interior 58 is formed. The air inlet 16 is slantedly configured relative to the longitudinal filter axis 30 in a sidewall 56 of the housing 12. The inner side 28 of the housing bottom 26 which is facing the filter interior 58 is at least sectionwise embodied at a slant relative to the longitudinal filter axis 30. It ends in the air inlet 16. Air which is flowing in through the air inlet 16, is deflected by the housing bottom 26 toward the filter element 40. Upon passing the filter interior 58, foreign matter can deposit. In order to obtain a high rate of deposition, the filter interior 58 can have a cross-section that narrows toward the housing bottom 26 and/or the filter interior 58 can have a spacing A in the direction of the longitudinal filter axis 30 which is greater than the maximum width B of the filter interior 58 perpendicular to the longitudinal filter axis 30.

While specific embodiments of the invention have been shown and described in detail to illustrate the inventive principles, it will be understood that the invention may be embodied otherwise without departing from such principles.

What is claimed is:

1. A tank venting filter comprising:
a housing extending in a direction of a longitudinal filter axis and comprising a bottom side and
a topside axially opposite the bottom side; and
a housing bottom member arranged at the bottom side and closing radially over the bottom side of the housing;
a circumferential sidewall radially surrounding the filter axis;
wherein the housing bottom member, tops side and circumferential sidewall define and surround an interior chamber of the filter housing;
a filter element arranged in an upper portion of the interior chamber of the housing such that the filter element is spaced axially away from the housing bottom member across an axial separation distance (A), the axial separation distance (A) defining a separation chamber within the interior chamber, the separation chamber positioned axially below the filter element in a direction of gravity;
wherein the housing bottom member closes over a lower end of the separation chamber of the housing in a downward direction relative to gravity;
the housing comprising
at least one flow opening formed in and extending radially through the circumferential sidewall of the housing above the housing bottom member, the at least one flow opening forming an air inlet to the separation chamber; and
an air outlet at the topside;
the housing bottom member comprising
an inner side facing the filter interior,
wherein the inner side ends in the air inlet and is positioned at least sectionwise at an obtuse angle relative to the longitudinal filter axis.

2. The tank venting filter according to claim 1, wherein the obtuse angle is 95° to 160°.

3. The tank venting filter according to claim 2, wherein the obtuse angle is 100° to 150°.

4. The tank venting filter according to claim 3, wherein the obtuse angle is 105° to 140°.

5. The tank venting filter according to claim 4, wherein the obtuse angle is 110° to 130°.

6. The tank venting filter according to claim 5, wherein the obtuse angle is 115° to 120°.

7. The tank venting filter according to claim 1, wherein the inner side of the housing bottom member is conical forming a cone extending at the obtuse and angle and having a cone tip pointing inwardly toward the filter element.

8. The tank venting filter according to claim 1, wherein the axial separation distance (A) is greater than 60% of a maximum width of the filter interior, the maximum width measured perpendicular to the longitudinal axis.

9. The tank venting filter according to claim 8, wherein the axial separation distance (A) is greater than 70% of the maximum width of the filter interior.

10. The tank venting filter according to claim 9, wherein the axial separation distance (A) is greater than 80 % of the maximum width of the filter interior.

11. The tank venting filter according to claim 1, wherein the filter interior is conically shaped so that, in the direction of the longitudinal filter axis, an inner diameter of the filter interior decreases toward the housing bottom.

12. The tank venting filter according to claim 1, wherein the filter interior is cylindrically shaped.

13. The tank venting filter according to claim 1, wherein the circumferential sidewall of the housing, between a lowermost area of the filter element, viewed in a projection perpendicular to the longitudinal filter axis on the circumferential sidewall, and an uppermost area of the housing bottom member, viewed in a projection perpendicular to the longitudinal filter axis on the circumferential sidewall, is of a closed configuration without openings extending through the circumferential sidewall.

14. The tank venting filter according to claim 1, wherein the housing comprises
a housing bottom part and
a housing cover,
wherein the filter element is fastened between the housing bottom part and the housing cover.

15. The tank venting filter according to claim 14, wherein a topside of the filter element is fastened between the housing bottom part and the housing cover.

16. The tank venting filter according to claim 14, wherein the housing bottom part and the housing cover are embodied of a plastic material and are connected to each other by a friction welded seam.

17. The tank venting filter according to claim 1, wherein the filter element is cup-shaped and comprises
a radial sidewall that can be flowed through and a filter element bottom that can be flowed through.

18. The tank venting filter according to claim 17, wherein the radial sidewall of the filter element is a star-shaped folded bellows.

19. The tank venting filter according to claim 7, wherein the axial separation distance (A) is measured from the cone tip to the filter element;
wherein the circumferential sidewall of the housing is circumferentially closed over the axial separation distance (A) from the filter element to the cone tip.

* * * * *